United States Patent [19]

Morita et al.

[11] 4,193,056
[45] Mar. 11, 1980

[54] OCR FOR READING A CONSTRAINT FREE HAND-WRITTEN CHARACTER OR THE LIKE

[75] Inventors: Toshiaki Morita, Nara; Hironari Takatori, Kobe; Fusao Makino, Yamatokoriyama; Syoichi Yasuda, Ikoma; Yoshiki Nishioka, Tenri, all of Japan

[73] Assignee: Sharp Kabushiki Kaisha, Osaka, Japan

[21] Appl. No.: 908,657

[22] Filed: May 23, 1978

[30] Foreign Application Priority Data

| May 23, 1977 | [JP] | Japan | 52-59589 |
| May 24, 1977 | [JP] | Japan | 52-60115 |
| May 24, 1977 | [JP] | Japan | 52-60116 |
| May 24, 1977 | [JP] | Japan | 52-60117 |
| May 25, 1977 | [JP] | Japan | 52-61433 |
| May 25, 1977 | [JP] | Japan | 52-61434 |

[51] Int. Cl.$^2$ ............................................. G06K 9/12
[52] U.S. Cl. ............................................. 340/146.3 AC
[58] Field of Search ........... 340/146.3 AC, 146.3 AE, 340/146.3 MA, 146.3 R

[56] References Cited

U.S. PATENT DOCUMENTS

| 3,873,972 | 3/1975 | Levine | 340/146.3 AC |
| 4,048,615 | 9/1977 | Chuang et al. | 340/146.3 AC |
| 4,061,998 | 12/1977 | Ito | 340/146.3 H |
| 4,107,648 | 8/1978 | Frank | 340/146.3 H |

FOREIGN PATENT DOCUMENTS

1253302 11/1971 United Kingdom .......... 340/146.3 AC

OTHER PUBLICATIONS

Grimsdale et al., "A System for the Automatic Recognition of Patterns," Proc. of I.E.E., vol. 106, Pt. B, No. 26, Mar., 1959, pp. 210–221.

Primary Examiner—Leo H. Boudreau
Attorney, Agent, or Firm—Birch, Stewart, Kolasch & Birch

[57] ABSTRACT

A character pattern to be recognized is divided into a predetermined number of parallel segments of equal width extending in one direction and character information on respective ones of the segments is read out via a line of photoelectric cells. Two pieces of the character information on two adjacent segments are evaluated together in developing symbolic information indicative of the correlation between two adjacent segment patterns. By the action of simplified feature extraction systems, a plurality of two-dimensional features are established in accordance with all combinations of the symbolic information which have been derived throughout the scanning procedure. The symbolic information is developed particularly with regard to the number of loops within the character pattern, the shape of the left edge portion, the shape of the right edge portion, the shape of the upper edge portion and the shape of the lower edge portion of the character pattern. These combinations of the symbolic information are compared with reference information prestored in a memory of an OCR (optical character reader).

2 Claims, 49 Drawing Figures

FIG.2
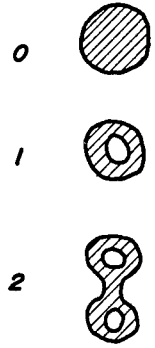
FIG.3
FIG.4  FIG.5
 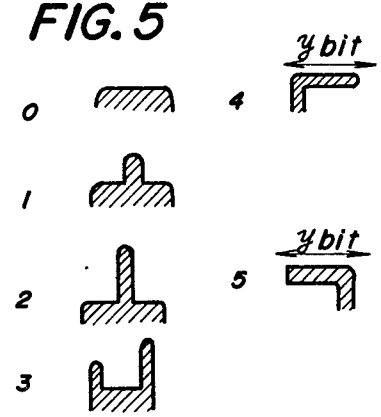
FIG.6  FIG.7  FIG.8
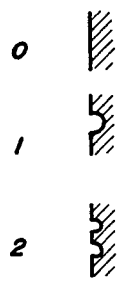  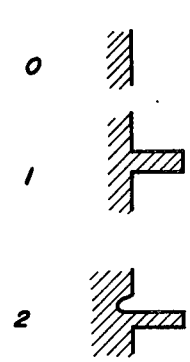

*FIG. 9*
n = 1
n = 2
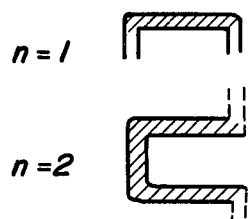
*FIG. 10*
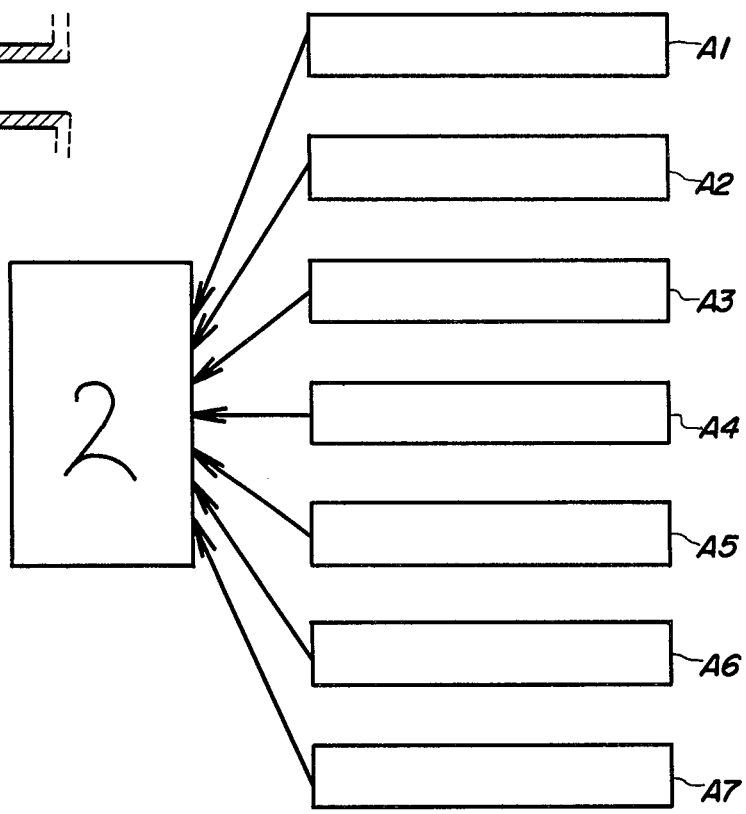
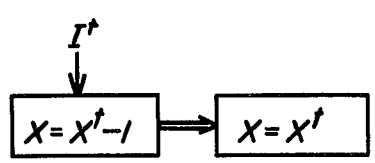
*FIG. 11*

| pattern | input | | | | | | | | | | | | | $I^t$ | |
|---|---|---|---|---|---|---|---|---|---|---|---|---|---|---|---|
| | $N_i^t$ | $N_o^t$ | $N_i^{t-1}$ | $N_o^{t-1}$ | $L^t$ | $L^{t-1}$ | $C_I$ | $C_O$ | $R/L$ | $SL_I$ | $SL_O$ | $SR_I$ | $SR_O$ | | |
| ▪ | 0 | 0 | | | | | | | | | | | | $F_0^*$ | S |
| ▪ | 0 | 1 | 0 | 0 | 0 | | | | | | | | | | |
| ◩ | 0 | 1 | 0 | 1 | 0 | 0 | 0 | 1 | | 1 | 0 | 1 | 0 | 0000 | V |
| ◰ | 0 | 1 | 0 | 1 | 0 | 0 | 0 | 1 | | 1 | 1 | 1 | 1 | | |
| ■ | 0 | 1 | 0 | 1 | 0 | 0 | 0 | 1 | | 0 | | 0 | | | |
| ◲ | 0 | 1 | 0 | 1 | 0 | 0 | 0 | 1 | | 1 | 0 | 1 | 1 | | |
| ◳ | 0 | 1 | 0 | 1 | 0 | 0 | 0 | 1 | | 1 | 0 | 0 | | 0001 | I |
| ◱ | 0 | 1 | 0 | 1 | 0 | 0 | 0 | 1 | | 0 | | 1 | 1 | | |
| ◸ | 0 | 1 | 0 | 1 | 0 | 0 | 0 | 1 | | 1 | 1 | 1 | 0 | | |
| ◹ | 0 | 1 | 0 | 1 | 0 | 0 | 0 | 1 | | 1 | 1 | 0 | | 0010 | D |
| ◺ | 0 | 1 | 0 | 1 | 0 | 0 | 0 | 1 | | 0 | | 1 | 0 | | |
| ▬ | 0 | 1 | 0 | 1 | 0 | 1 | 0 | 1 | 0 | | | | | 0100 | LH |
| ▬ | 0 | 1 | 0 | 1 | 0 | 1 | 0 | 1 | 1 | | | | | 0101 | RH |
| ▮ ▪ | 0 | 1 | 1 | 0 | | | 1 | 0 | 0 | | | | | 0110 | LP |
| ▪ ▮ | 0 | 1 | 1 | 0 | | | 1 | 0 | 1 | | | | | 0111 | RP |

*FIG. 26(A)*

| pattern | input |||||||||||| $I^t$ ||
|---|---|---|---|---|---|---|---|---|---|---|---|---|---|---|
| | $N_i^t$ | $N_o^t$ | $N_i^{t-1}$ | $N_o^{t-1}$ | $L^t$ | $L^{t-1}$ | $C_i$ | $C_o$ | R/L | SLi | SLo | SRi | SRo | | |
| ⬛ | 0 | 1 | 1 | 0 | 0 | | 0 | 1 | | | | | | 0011 | VJ |
| ▬ | 0 | 1 | 0 | 0 | 1 | | | | | | | | | 1010 | H |
| ▬ | 0 | 1 | 0 | 1 | 1 | 1 | 0 | 1 | | | | | | | |
| ▬ | 0 | 1 | 0 | 1 | 1 | 0 | 0 | 1 | 1 | | | | | 1000 | HL |
| ▬ | 0 | 1 | 0 | 1 | 1 | 0 | 0 | 1 | 0 | | | | | 1001 | HR |
| ▬ | 0 | 1 | 1 | 0 | 1 | | 0 | 1 | | | | | | 1011 | HJ |
| ▪ ▪ | 1 | 0 | 0 | 0 | | | | | | | | | | 1110 | P |
| ▪ ▪ | 1 | 0 | 1 | 0 | | | 1 | 0 | | | | | | | |
| ▪ ▪ | 1 | 0 | 0 | 1 | | | 1 | 0 | 1 | | | | | 1100 | PL |
| ▪ ▪ | 1 | 0 | 0 | 1 | | | 1 | 0 | 0 | | | | | 1101 | PR |
| ▬ | 1 | 0 | 0 | 1 | | | 0 | 1 | | | | | | 1111 | F |
| ▬ | 1 | 0 | 1 | 0 | | | 0 | 1 | | | | | | | |
| ▪▪▪ | 1 | 1 | | | | | | | | | | | | F1 ※ | T |
| OTHERS | | | | | | | | | | | | | | F2 ※※ | |

FIG.26(B)

| feature group pattern | ① number loops | ② lower shape | ③ upper shape | ⑤ left shape | ⑥ right shape |
|---|---|---|---|---|---|
| 0 | ○ | ⌣ | ⌢ | ▊ | ▊ |
| 1 | • | Y | ⋏ | ▊ | ▊ |
| 2 | • | ⌣ | ⌐ | ▊ | ▊ |
| 3 | • | ⌣ | ⌐ | ▊ | × |
| 4 | • | Y | ⋏ | × | × |
| 5 | • | ⌣ | ⊤ | ▊ | ▊ |
| 6 | ○ | ⌣ | ⊤ | ▊ | ▊ |
| 7 | • | Y | ⌐ | × | ▊ |
| 8 | 8 | ⌣ | ⌢ | × | × |
| 9 | ○ | Y | ⌢ | × | ▊ |
| A | ○ | ⅄ | ⌢ | ▊ | ▊ |
| E | • | ⌣ | ⊤ | ▊ | ▊ |
| F | • | Y | ⊤ | ▊ | ▊ |
| X | • | ⅄ | ⋏ | ▊ | ▊ |
| — | • | ⌣ | ⌢ | ▊ | ▊ |

FIG. 29

| A9 | A8 | A7 | A6 | A5 | A4 | A3 | A2 | A1 | A0 |
|----|----|----|----|----|----|----|----|----|----|
| . | | ⌣ | | ⌒ | | | ° | | |
| 0 | 0 | 0 | 0 | 0 | 0 | 0 | 0 | 0 | 0 |
| ○ | | ⋎ | | 人 | | | — | | |
| 0 | 1 | 0 | 1 | 0 | 0 | 1 | 0 | 0 | 1 |
| 8 | | Ⲩ | | 人 | | | ∟ | | |
| 1 | 0 | 1 | 0 | 0 | 1 | 0 | 0 | 1 | 0 |
| ? | | ⵖ | | 사 | | | ⌐ | | |
| 1 | 1 | 1 | 1 | 0 | 1 | 1 | 0 | 1 | 1 |
| | | | | ⌈ | | | ⊏ | | |
| | | | | 1 | 0 | 0 | 1 | 0 | 0 |
| | | | | ⌈ | | | ⊐ | | |
| | | | | 1 | 0 | 1 | 1 | 0 | 1 |
| | | | | ⌉ | | | ⊏̄ | | |
| | | | | 1 | 1 | 0 | 1 | 1 | 0 |
| | | | | ⌐ | | | ⊐̄ | | |
| | | | | 1 | 1 | 1 | 1 | 1 | 1 |

*FIG. 30*

| A7 | A6 | A5 | A4 | A3 | A2 |
|----|----|----|----|----|----|
| ⫽ | | ⫽ | | ⫽ | |
| 0 | 0 | 0 | 0 | 0 | 0 |
| ⫽ | | ⫽ | | ⫽ | |
| 0 | 1 | 0 | 1 | 0 | 1 |
| ⫽ | | | | ⫽ | |
| 1 | 0 | 1 | 0 | 1 | 0 |
| ⫽ | | ⫽ | | ⫽ | |
| 1 | 1 | 1 | 1 | 1 | 1 |

*FIG. 31*

|   | number loops | number lateral | lower bays | lower swells | upper bays | upper swells | left bays | left swells | right bays | right swells | left swell shape | right swell shape |
|---|---|---|---|---|---|---|---|---|---|---|---|---|
| 0 | 1 | X | 0 | 0 | 0 | 0 | 0 | 0 | 0 | 0 | 1 | 1 |
| 1 | 0 | 0 | 0 | 1 | 0 | 1 | 0 | 0 | 0 | 0 | 0 | 0 |
| 2 | 0 | 2 | 0 | 0 | 0 | 0 | 1 | X | 1 | 1 | X | X |
| 3 | 0 | 3 | 0 | 0 | 0 | 0 | 2 | X | 0,1 | 0 | X | X |
| 4 | 0 | 1 | 0 | 1 | 1 | 2 | 0 | 0 | 0 | 1 | X | X |
| 5 | 0 | 3 | 0 | 0 | 0 | 0 | 1 | X | 1 | 1 | X | X |
| 6 | 1 | X | 0 | 0 | 0 | 1 | 0 | 0 | X | 0 | 1 | X |
| 7 | 0 | 1 | 1 | 1/2 | 0 | 0 | X | 0 | 0 | 0 | X | 0 |
| 8 | 2 | X | 0 | 0 | 0 | 0 | X | 0 | X | 0 | 2 | 2 |
| 9 | 1 | X | X | 1 | 0 | 0 | X | 0 | 0 | 0 | 1 | 0 |
| A | 1 | X | 1 | X | 0 | X | 0 | 0 | 0 | 0 | 0 | 0 |
| B | 2 | X | 0 | 0 | 0 | 0 | 1 | 2 | X | 0 | X | X |

*FIG. 42*

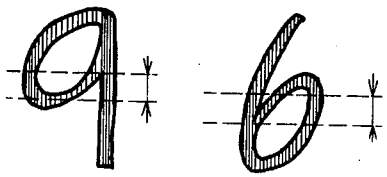
FIG. 43
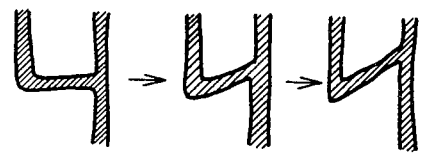
FIG. 44
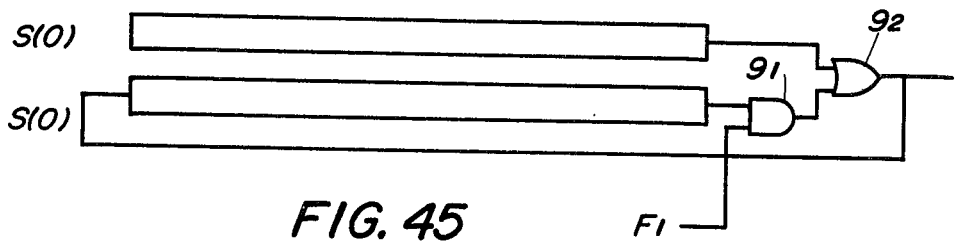
FIG. 45
FIG. 46

OCR FOR READING A CONSTRAINT FREE HAND-WRITTEN CHARACTER OR THE LIKE

BACKGROUND OF THE INVENTION

The present invention relates to a method recognizing a character pattern or the like in an optical pattern reader.

There are generally two ways of reading a character pattern or the like on a sheet through the use of an optical pattern reader (referred to as "OCR" hereinafter): one where a character pattern is read and recognized with certain limits placed thereupon to simplify recognition logic; and the other where a limit-free or constraint-free character pattern such as a freely written character is read and recognized which suffers from the complexity of recognition logic to some extent.

The concern of the present invention is directed to the latter, namely, a way of recognizing a constraint-free handwritten character. The conventional approaches for recognition of such, handwritten characters are by a feature extraction method. According to the prior art feature extraction method, a character pattern is divided into a predetermined number of segments in line with a basic pattern standard which reflects features of a specific pattern well. Each of the segments is called a picture element. In order that features of a pattern with diversity like a handwritten character can be extracted and thus extracted features be made adapted to some of the picture elements, all combinations of the features ranging from ones of the highest probability of the appearance to ones of the lowest probability should be written into a dictionary area within a system memory together with correlation information between combinations of the features and character patterns. To make recognition of a handwritten character possible necessitates a bulky look-up table in the dictionary area, a system memory of extremely large capacity, a lot of time for retrieval of the dictionary area, and the pursuit of two dimensional pattern features. These parameters make recognition logic and a reading out scheme complicated and present a severe problem with practical use of the OCR.

Another problem is that an attempt to minimize reading error will cause an increase in a rejection or failure rate and an attempt to minimize the rejection rate, on the other hand, will cause an increase in the probability of reading error because the look-up table in the dictionary area is too complicated.

SUMMARY OF THE INVENTION

Accordingly, it is an object of the present invention to provide an OCR which overcomes the prior art problems discussed above.

Pursuant to the concept of the present invention, a character pattern is first divided into a predetermined number of parallel segments extending in one direction. While taking account of two pieces of pattern information written on the two adjacent segments, the correlation between the two segment patterns is identified for feature extraction purposes. According to the present invention, two-dimensionally represented character patterns can be treated in a one-dimensional manner, greatly simplifying recognition logic.

A plurality of feature extraction systems used with the present invention will vary in contents in a preselected order with variations in the identified information of respective one of the segments. Two dimentional features representative of the number of loops and the peripheral edge portions are established with the operation of the feature extraction systems. Therefore, the present invention provides a character recognition method or system which can recognize a handwritten character or illustration having wide freedom at a much lower error rate through the use of a smaller sized look-up table and a simplified logic circuitry compared to those known heretofore.

BRIEF DESCRIPTION OF THE DRAWINGS

Other objects and many of the attendant advantages of the present invention will be easily appreciated as the same becomes better understood by reference to the following detailed description which considered in conjunction with the accompanying drawings in which like reference numbers designate like parts throughout the figure thereof, and wherein:

FIGS. 2 through 9 are explanatory diagrams of the definitions of features of a character pattern to be extracted;

FIG. 10 is a block diagram showing a basic identification scheme of the OCR of the present invention;

FIG. 11 shows transition instructions and transition conditions;

FIGS. 15 through 19 show the transition conditions of the contents of the feature detection system caused by the transition instructions wherein FIG. 15 is a transition chart with regard to the number of loops of a character pattern to be recognized, FIG. 16 is a transition chart with regard to the lower edge portion of the character pattern, FIG. 17 is a transition chart with regards to the upper edge portion of the character pattern, FIG. 18 is a transition chart with regard to the number of hollows on the left edge portion of the character pattern, and FIG. 19 is a transition chart as regards the number of hollows on the right edge portion of the character pattern;

FIGS. 26(A) and 26(B) show the relationship between codes representative of features of a character pattern and the transition instructions;

FIG. 29 is an example of a look-up table showing characters and their associated features;

FIGS. 30 and 31 are code tables showing the respective features;

FIG. 42 is an example of a look-up table in another preferred form;

FIG. 43 shows a shape peculiar to numerals "9" and "6";

FIG. 44 shows changes in conditions of the above illustrated peculiarity;

FIG. 45 is an example of a processor for detecting a lateral segment; and

FIGS. 46(A) through 46(D) are explanatory diagrams for explanation of the operation of the circuit of FIG. 45.

DETAILED DESCRIPTION OF THE INVENTION

Before discussing the overall system in greater detail, it may be of advantage to describe the basic principles of the present invention. The concept of the present invention will be described in terms of how to recognize a numeral "2", by way of example.

A character pattern marked or written on a record reception sheet may be read out via an optical system in a well known manner and then converted into electric signals via a photoelectric circuit. These electric signals are then stored into a system memory after a preliminary processing, such as for noise reduction.

Figure 1:
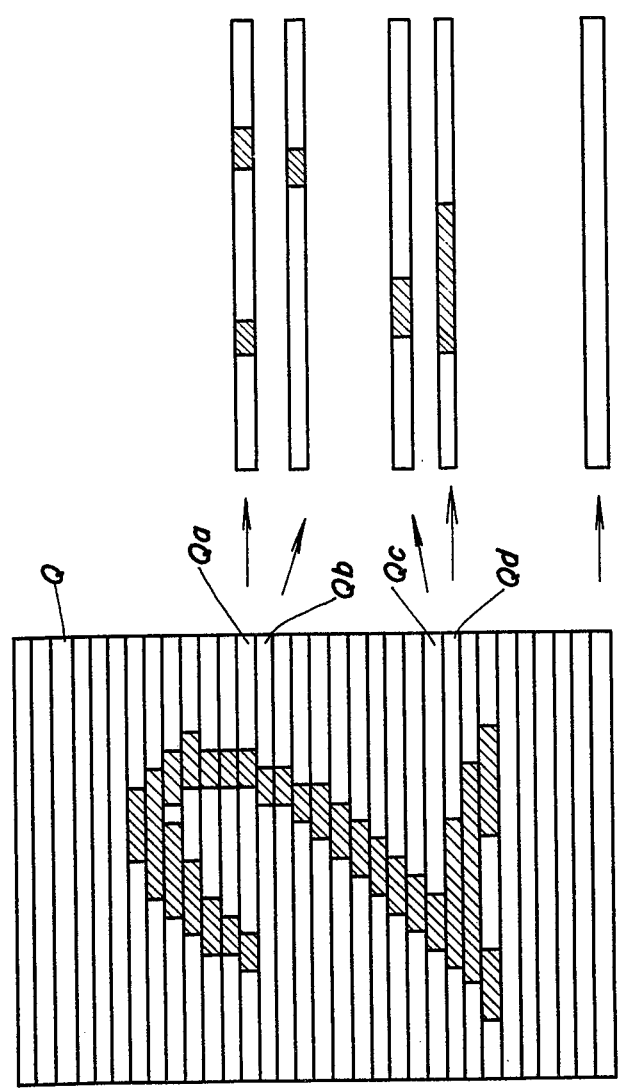
FIG. 1 is an explanatory diagram as to how to segment a character pattern according to the present invention.

A memory area of the system storage denoted Q in FIG. 1 is able to store information of a full-area character. In the given example, the full-area character storage area may be 24 bits in width by 32 bits in length. Each of the horizontal segments have a capacity of 24 bits and there are 32, 24-bit segments, to form the capacity of a full-area character.

The pattern "2" is divided for example in the horizontal direction and the respective segments of the pattern are stored on their associated storage lines. All features of a character pattern to be recognized are grouped and defined as follows.

FIRST FEATURE GROUP

Subclass I. the number of loops,
Subclass II. the shape of the lower edge portion,
Subclass III. the shape of the upper edge portion, and
Subclass IV. connection with a lateral line,

SECOND FEATURE GROUP

Subclass V. the number of hollows on the left edge portion,
Subclass VI. the number of hollows on the right edge portion, and
Subclass VII. swells on the right edge portion.

A lateral line of Subclass IV is defined as a portion of a character which is at least three bits long in the horizontal direction, as distinguished from swells of Subclass VII which must be more than three bits high in a vertical direction.

Subclass I. THE NUMBER OF LOOPS

This means the number of circular shaped loops such as the two loops in the numeral "8" and, in the case where a pattern sought to be recognized is a numeral or an alphabetic letter, the number of loops can be classified below as shown in FIG. 2.

(0) No loop,
(1) The number of loops is one and a space encircled by the loops is 1 bit or more large,
(2) The number of loops is two. There is provided a waist seven bits or less narrow at the middle with a space within the respective loops 1 bit or more large. As an alternative, there could be no waist while the upper space is one bit or more wide and the lower two bits more wide.

It should be noted that the loops set forth are defined as ones which have a one bit or more space within the respective loops after the preliminary processing. In the case where there are two loops having no waist as viewed in FIG. 3, characters like "8" can be distinguished from the character of FIG. 3 by placing the limit that the upper loop be two bits or more large or it is not an "8". Those which fail to meet the above definition measure, those having as many as three loops, and those having no connection between their two major portions can be classified into other categories.

Subclass II. THE SHAPE OF THE LOWER EDGE PORTION

This theme can be classified by the length and the number of lines extending from the lower edge portion as viewed in FIG. 4.

(0) No swell on the lower end portion,
(1) The length of the swell extends beyond a given value, and
(3) there are two or more swells.

The length of lines within the tip portion should be considered for identification criteria because any character pattern with the same length may have two possible classes, namely, the subclass (0) or (1) or the subclass (2). A character pattern wherein two swells are included with the length extending over 6 bits should be classified in the subclass (2).

Subclass III. THE SHAPE OF THE UPPER EDGE PORTION

The definition of this category depends upon the length and the number of lines extending from the upper edge portion and the shape of the uppermost horizontal line as illustrated in FIG. 5.

(0) There is no swell and the horizontal length is for example 8 bits or less,
(1) There is an upper oriented swell having less than given height (for example, 2 bits or less) and the horizontal line is less than 8 bits long,
(2) There is an upper oriented swell of more than given height (for example, 3 bits or more) and the horizontal line is for example less than 8 bits long,
(3) Swells on the upper edge portion are two and the horizontal length is for example, less than 8 bits long.
(4) There is no upper oriented swell and the horizontal line is for example more than 8 bits long. Also, there is provided a pendent portion at the left edge.
(5) No upper oriented swell is provided but a pendent portion is seen at the right edge.

The length of lines used in the above summarized definitions means the length exclusive of the tip portion and the root portion. In the case where a pattern in question has a shape to be classified into the subclass (2) and the shape of the horizontal line to be classified into the subclass (4) of FIG. 5 over the first named shape, for example, the upper shape in the subclass (4) will be given priority. However, in the case where two swells extend for more than 4 bits, one of which extends longer like the shape to be classified into the subclass (2) of FIG. 5, the lower swell will be given priority, that is, the subclass (3) of FIG. 5.

Subclass IV. CONNECTION TO LATERAL LINE

This concept will be classified as follows in accordance with the number n of lateral lines and whether the lateral line is connected on the left or the right thereof. See FIG. 9.

(1) No connection or junction where n=1,
(2) Junction on the left edge portion where n=1.

If a loop is evaluated, upper and lower circular areas should be considered respectively as a lateral line. It does not matter whether or how any other lateral line besides the lowest one is connected.

Subclass V. THE NUMBER OF HOLLOWS ON THE LEFT EDGE PORTION

As shown in FIG. 6, this is the number of hollows located on the left edge portion, which are 2 bits or more deep and surrounded by a more than 45 degrees inclination. It does not matter whether the inside of hollows are shaped stepwise.

(0) no hollows,
(1) one hollows, and
(2) two hollows,

Subclass VI. THE NUMBER OF HOLLOWS ON THE RIGHT EDGE PORTION

As shown in FIG. 7, the concern in this Figure is the number of the hollows which are located on the right edge portion of a pattern and interposed between more than 45 degrees inclinations, with the depth of not less than 2 bits. The shape as regards the inside of these hollows is not in question.

(0) no hollows,
(1) one hollow, and
(2) two hollows,

Subclass VII. SWELLS ON THE RIGHT EDGE PORTION

FIG. 8 suggests the following definition.
(0) No swell,
(1) A simple swell or any other swell which does not come under the last subclass (2), and
(2) Above a swell there is located a hollow which is 2 bits or more deep and has no left upward inclination.

The method or system of the pattern recognition of the present invention will now be described.

In FIG. 10, systems $A_1$ through $A_7$ are provided for extracting the above defined features I through VII, which will change in the internal condition Z upon receipt of externally applied transition instructions $I^t$. In other words, the respective feature extracting systems $A_1$ through $A_7$ stand first at their condition $X^0$ and then change from $X^{t-1}$ to $X^t$ (wherein $t=1, 2, 3 \ldots 32$), namely, up to the internal condition $X^{32}$.

As noted earlier, a character pattern sought to be recognized is divided in a matrix of 24 bits × 32 bits. Out of lines $D_1, D_2, D_3 \ldots D_{32}$ each having the width of 24 bits in the horizontal direction (cf., $Q_A, Q_B, Q_C \ldots$ in FIG. 1, for example), two adjacent lines or segments $D^t$ and $D^{t-1}$ representative of the shape and relative position therebetween are evaluated when forming transition instructions $I^t$. For example, the transition instructions $I^{10}$ are established by evaluation of two adjacent lines $D_9$ and $D_{10}$ which show the shapes and the relationship between the character portions $L_1$ and $L_2$ as depicted in a box "a" by FIG. 12(a). It should be understood that according to one of the major features of the present invention only two adjacent lines $D^t$ and $D^{t-1}$ are evaluated when developing the transition instructions $I^t$.

There is a difference between the first and second feature groups from which one can develop $I^t$ from $D^t$ and $D^{t-1}$.

Figure 13:
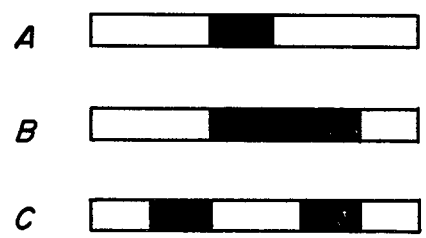
FIG. 13 shows a specific condition in FIG. 12.
Figure 14:
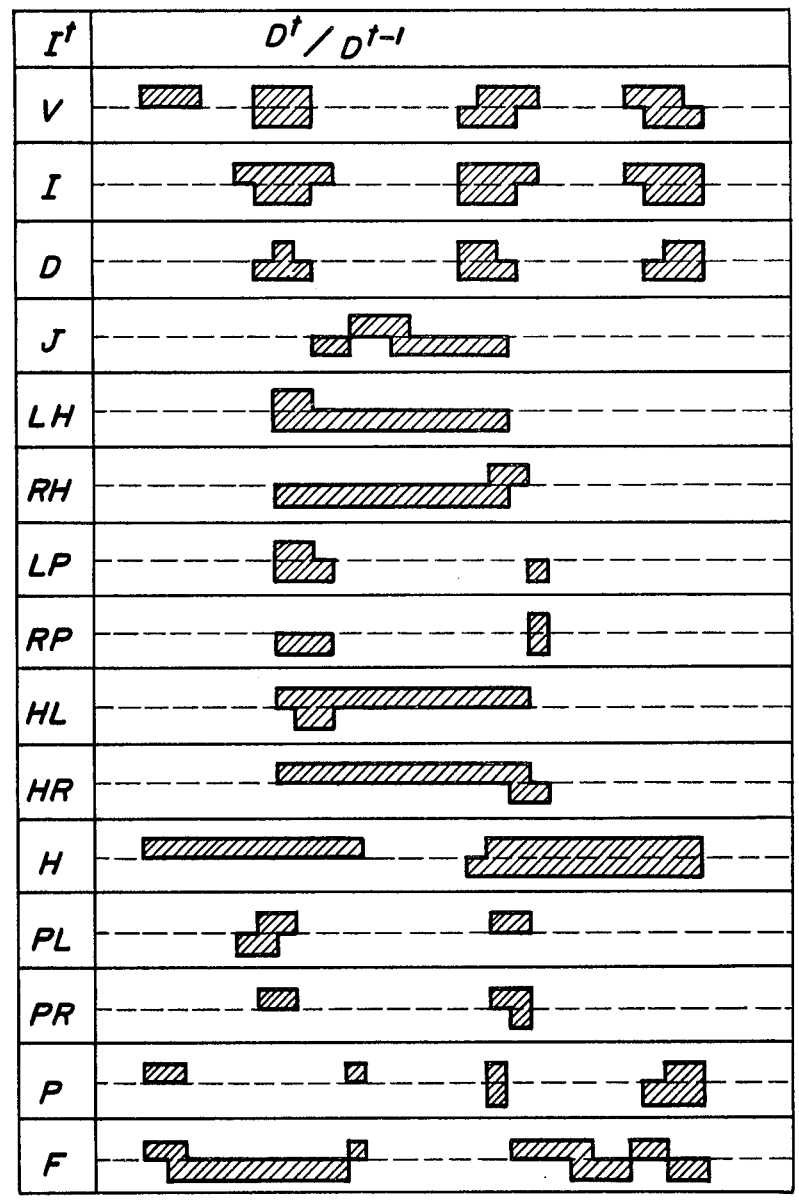
FIGS. 14(A) through 14(C) show the relationship between the transistion instruction derived from the feature detection systems and a character pattern.
Figure 14:
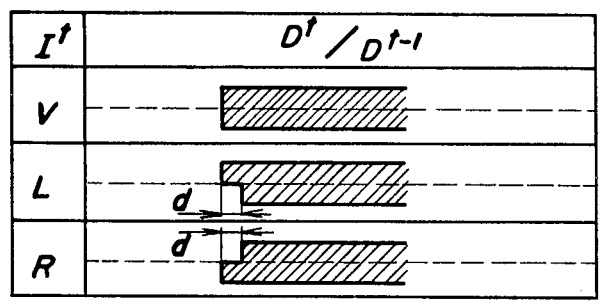
Figure 14:
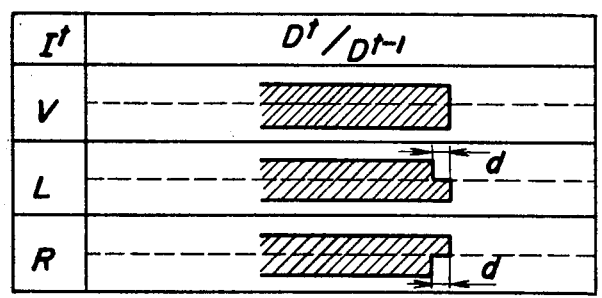
Figure 15:
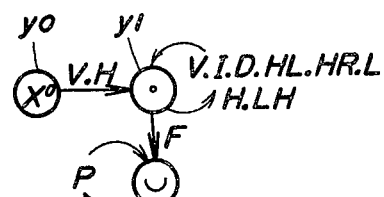
Figure 16:
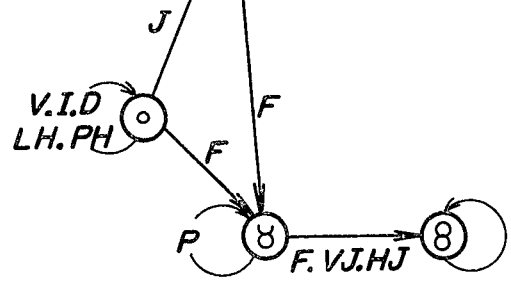
Figure 16:
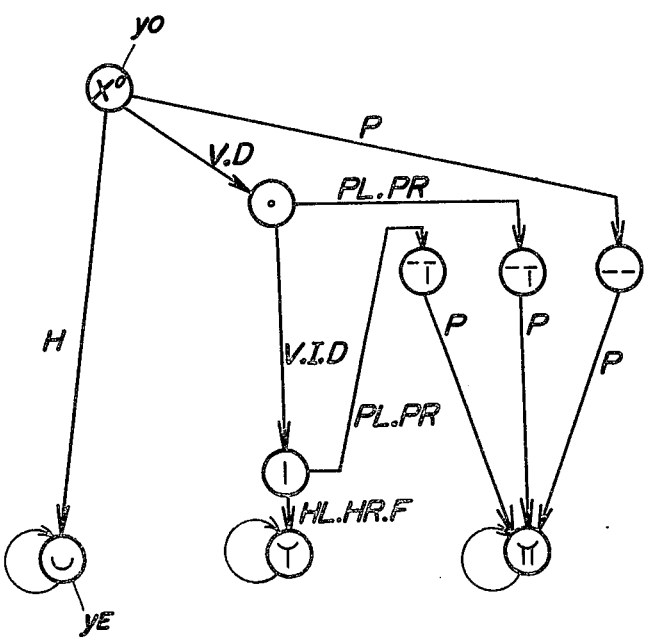

In connection with the first feature group I. to IV. as defined hereinabove, information $D^t$ indicative of the line or segment t is classified into A, B and C as suggested in FIG. 13 according to the number of portions, n, and the length X of the portion of a character appearing on that line: A where n=1 and χ is relatively short; B where n=1 and χ is relatively long; and C where n=2. In addition, the external information $I^t$ can be defined by the above discussed way of classification A, B and C and symbols V, I, D, . . . F as listed in FIG. 14(A) which depend essentially upon whether the character portions on the lines t and t−1 are connected at the left edge portion or at the right edge portion. In FIG. 14(A), the upper half on each of the symbols V, I, D . . . is occupied by the character portion on the line $D^t$ and the lower half on the line $D^{t-1}$. As in the example of FIG. 12, $I^t$=LH with regard to the lines $D^9$ and $D^{10}$ and $I^t$=PR with regard to the lines $D^{19}$ and $D^{20}$.

Regarding the second feature group $I^t$ is decided only upon the left or right positional relationship between $D^t$ and $D^{t-1}$. FIG. 14(B) shows the definition of the transition instructions $I^t$ with regard to the feature subclass as described hereinbefore, V, whereas FIG. 14(C) shows the definition of the transition instructions $I^t$ with regard to the subclasses VI and VII, left edge criteria defined on page 9. For example, review of FIG. 14(B) reveals that the transition instructions $I^t$ are "R" for the subclass V as defined hereinbefore for the above example "a" in FIG. 12 (lines $D^9$ and $D^{10}$). That is, there is a hollow at the left edge portion of the two lines or segments $D^9$, $D^{10}$ which corresponds to transition instruction "R" of FIG. 14(B).

Upon the application of the transition instructions $I^t$ as defined above the feature extracting systems $A_1$–$A_7$ will change in internal conditions pursuant to the instructions $I^t$, the transition process of which is illustrated in FIGS. 15 through 19. Legends encircled in FIGS. 15 through 19 indicate the internal condition X. The internal condition X will advance toward the terminal condition under the direction of the transition instructions $I^t$. These transitions never happen to an upper or lower vacant area where any portion of a character pattern stands.

The transition instructions of FIGS. 15 to 19 are generated by a ROM (read only memory) to be described more fully hereinafter.

Figure 12:
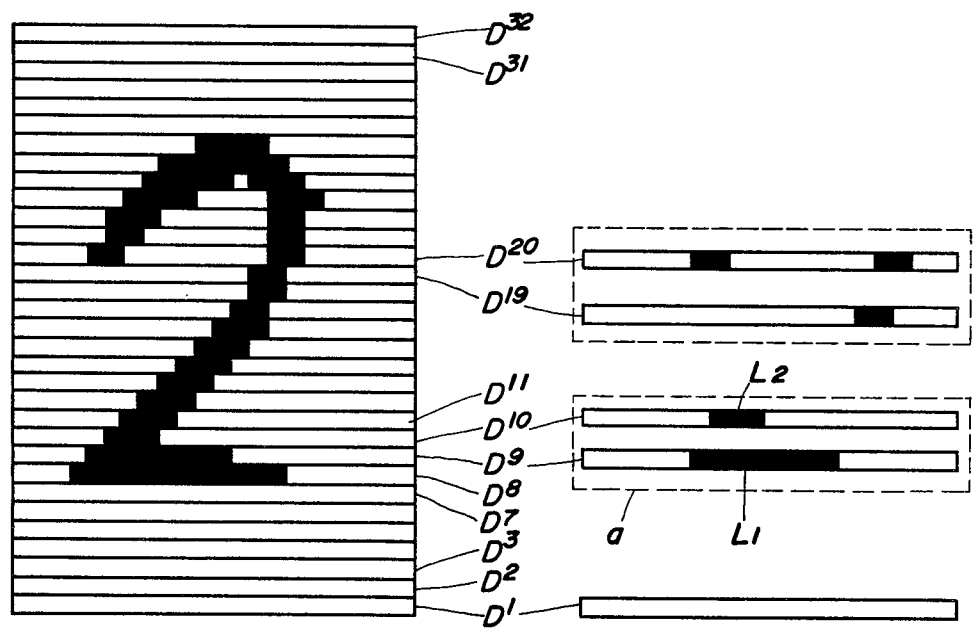
FIG. 12 shows a way of reading out a character pattern in one preferred form of the present invention.
Figure 17:
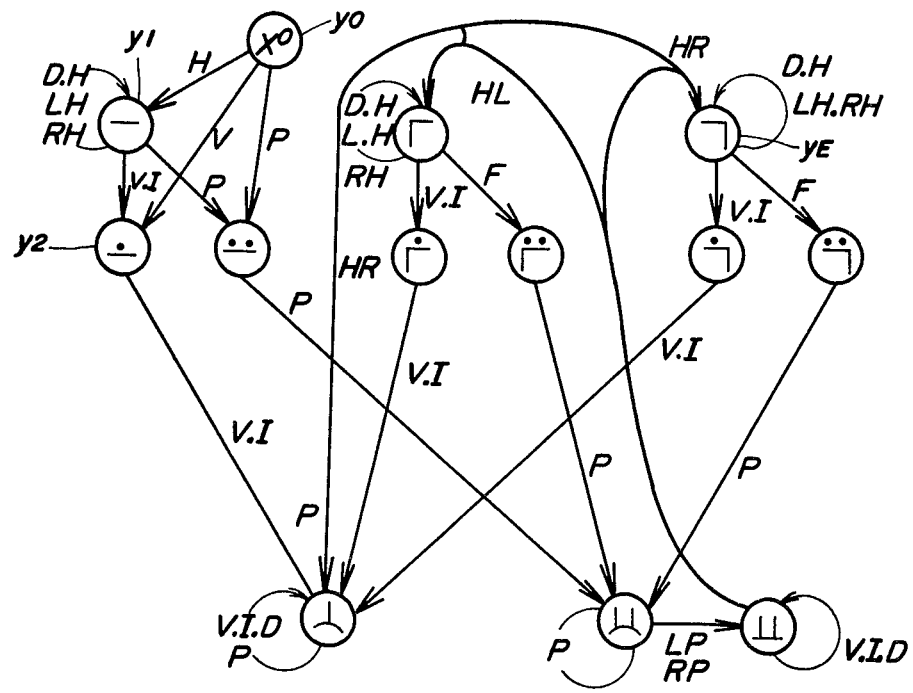
Figures 18, 19:
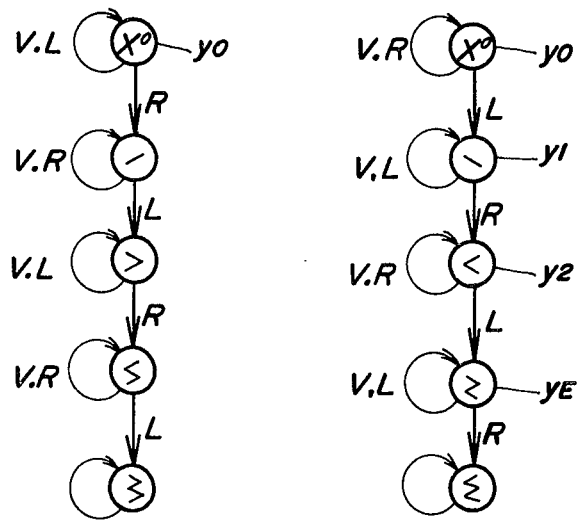

The transition of the internal condition will be described in detail referring to a character "2" as illustrated in FIG. 12. The transition instructions with regard to the lines $D_7$ and $D_8$, namely, the symbol $I^8$ ($I^t$ where $t=B$) in FIG. 14(A) and accordingly the feature detector system $A_1$ of FIG. 10 with regard to the number of loops (Subclass I) changes in the internal condition from $y_0$ to $y_1$ as viewed in FIG. 15. The feature detector system $A_2$ for Subclass II, the shape of the lower edge portion, changes in $y_O$ to $y_E$ as viewed from FIG. 16. Similarly, the contents of the detector system $A_3$ for Subclass III changes from $y_0$ to $y_1$ as shown in FIG. 17 while the detector systems $A_5$ and $A_6$ (Subclasses V and VI) remain in $y_0$. Thus no transition diagrams are needed for detector systems $A_5$, $A_6$ in example of FIG. 12.

After completing the scan of the ninth line, the transition instructions $I^9$ come to "LH" in FIG. 14(A) which represents the symbol of the character segment on the eight and ninth lines for the first feature group. The feature detecting system $A_1$ is held in the condition $y_1$. The contents of $A_2$ is held in $y_E$.

By the scanning of the ninth line "L" is sensed in the character shown in FIG. 14(C) so that the character detector system $A_6$ advances toward the condition $y_1$. The character of FIG. 14(C) after the tenth line $D_{10}$ comes to "L" with the condition $y_1$ unchanged. The character of FIG. 14(C) after the eleventh line $D_{11}$ is "R". The symbol in FIG. 14(A) on the eleventh line $D_{11}$ is evaluated as "V" so that the detector system $A_3$ is shifted into $y_2$ in FIG. 17. The detector system $A_7$ is held in $y_1$. Eventually, the feature detecting system $A_6$ arrives at $y_E$ of FIG. 19.

The other respective feature detector systems $A_1$ through $A_7$ also will change in condition sequentially. When the highest or twentysixth line scanning comes to an end, the respective feature detector systems $A_1$ through $A_7$ are eventually placed under the conditions corresponding to the shape as shown in FIG. 29 at line a wherein $A_1$ is in $y_1$ of FIG. 15, $A_2$ is in $y_E$ of FIG. 16, $A_3$ is in $y_E$ of FIG. 17 and so on.

Figure 20:
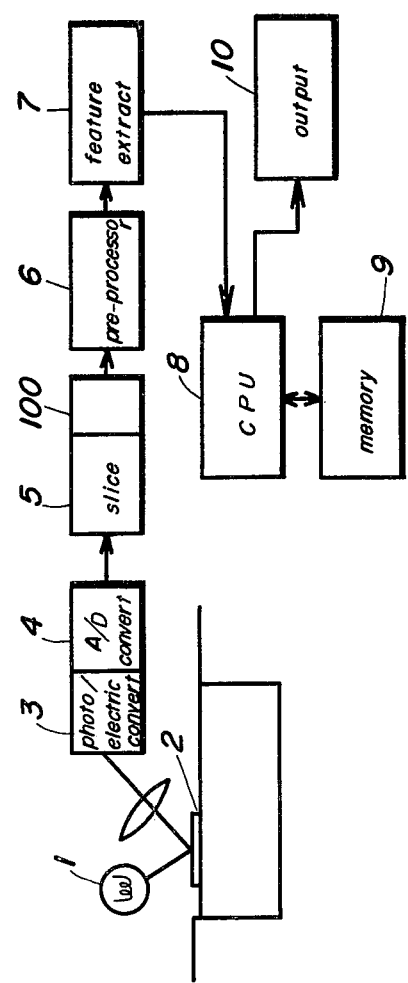
FIG. 20 is a block diagram of one preferred form of the present invention.

A CPU (central processor unit) 8 of FIG. 20 stores a look-up table as shown in FIG. 29 in an encoded format. The respective feature detector systems $A_1$ through $A_7$ send to the CPU 8 codes "." representative of the number of loops, codes "$\smile$" representative of the shape of the lower edge portion, codes "$\sqcap$" representative of the shape of the upper edge portion, codes

representative of the shape of the left edge portion, and codes

representative of the right edge portion.

While comparing these codes with the look-up table stored in the CPU 8, the CPU 8 passes the decision that the pattern in question is the numeral "2", providing the output indicative the numeral "2".

FIG. 20 shows a basic scheme of the OCR useful with the present invention. A reading station 1 consisting of a light source and an optical system irradiates a character pattern receipt slip 2 and light reflected from the slip 2 is converted into electric signals via a photoelectric circuit 3. A one-character slice circuit 5 slices off data of one-character length from the reading station and then data of 24 bits in width by 32 bits in height is loaded into a storage 100. The thus sliced data is sent to a preliminary processor circuit 6 where an isolated one-bit is removed and spacings in the horizontal direction and in the vertical direction are filled with one-bit thereby to eliminate noise.

A feature extracting circuit 7 is adapted to extract the above defined features of Subclasses I through VII from the preliminarily processed data, which encodes the extracted features. The CPU 8 decides whether there is agreement between the feature codes and the look-up table stored in the storage 9. The conclusion is developed at an output unit 10.

Figure 21:
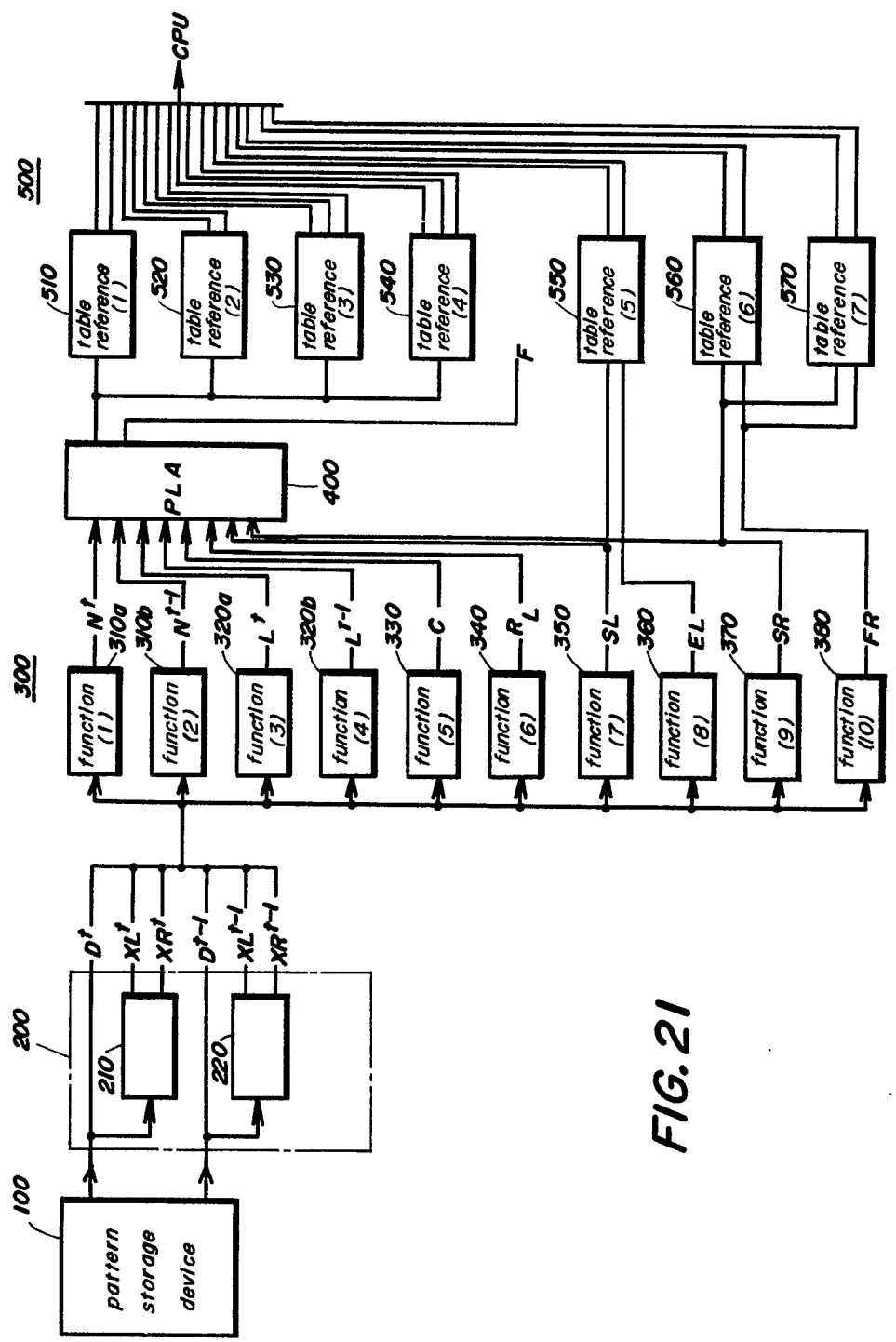
FIG. 21 is a detailed diagram of a portion of the preferred form shown in FIG. 20.

FIG. 21 shows details of the feature extracting circuit 7. This includes a storage 100 (as indicated in FIG. 20), a coordinates detector 200 for detecting the edge position of the character pattern portion, a family of function units 300 which extract the above defined symbols V, I, etc., from information on the lines $D^t$ and $D^{t-1}$ (repeatedly, only two lines at a time), a code converter 400 which encodes the outputs of the function units 300 and provides the transition instructions $I^t$, and a family of table reference circuits 500 which change in internal conditions in accordance with the transition instructions $I^t$.

Figure 22:
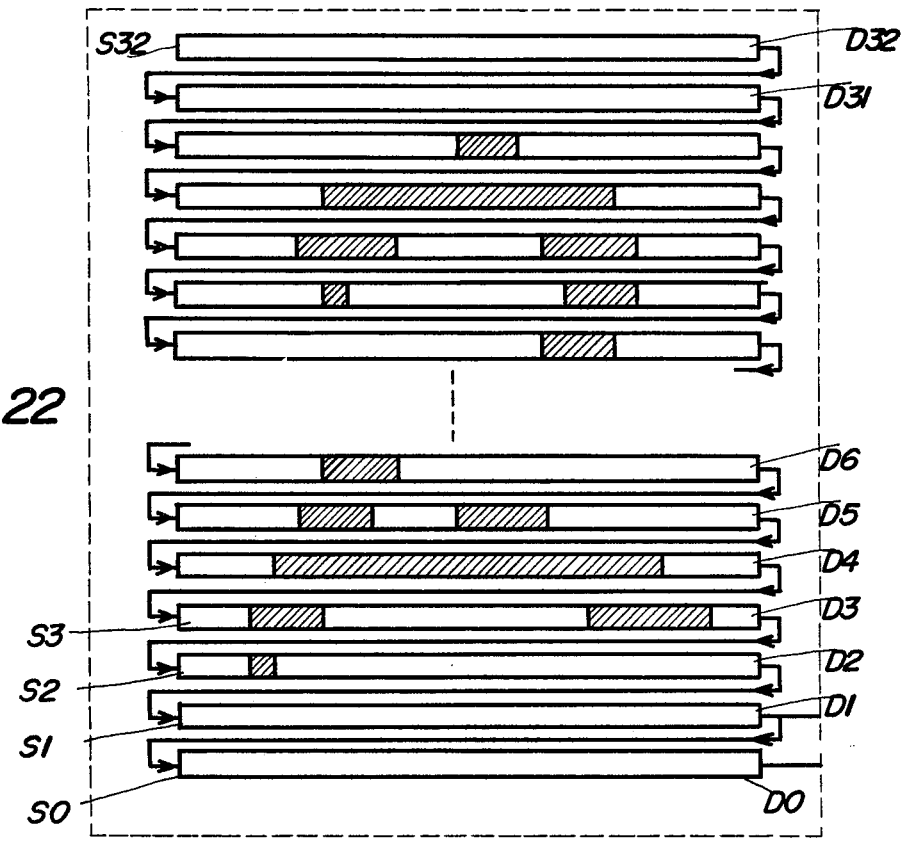
FIG. 22 is a block diagram of implementations of a system memory.

As viewed from FIG. 22, the storage 100 is a series of thirty-three 24-bit shift registers $S_0$, $S_1$, $S_2$ ... $S_{32}$ each register storing one-line of character information. The storage 100, therefore, stores the pattern information in a matrix of 24 bits $\times$ 32 bits as a whole. FIG. 22 is illustrated under the hypothesis that the numeral "2" is being stored. The lowest shift register $S_0$ of FIG. 22 is provided for auxiliary purposes, for example, storing blank information.

The information D of the line t of the character pattern from the slice circuit 5 is loaded into the t th line shift register $S^t$ ($t=1, 2, 3, \ldots$) within the storage 100. Upon the application of clock signals to the storage 100 the information on the respective shift registers is shifted to the right. When the twenty-fourth clock signal is received, the information $D^t$ on the specific shift register $S^t$ is transferred into the one-stage lower shift register $S$ ($t-1$). At this moment the information $D^t$ on the first line is transferred from the shift register $S_1$ to the coordinates detector 200 and then to the shift regiseter $S_0$. The blank pattern information $D^0$ is derived from the shift register $S_0$. When the twenty-fourth clock signal is received for the second time, the information $D^t$ as regards the t th line enters the shift register $S$ ($t-2$) and the information $D^2$ as regards the last second line is derived from the shift register $S_1$, and the information $D^1$ as regards the last or lowest line is transferred from the shift register $S_0$ to the coordinates detector 200. If twenty four clock pulses are applied to the storage 100 thirty-two times, then information of one-character area or extent will be fully derived from the storage 100.

Figure 23:
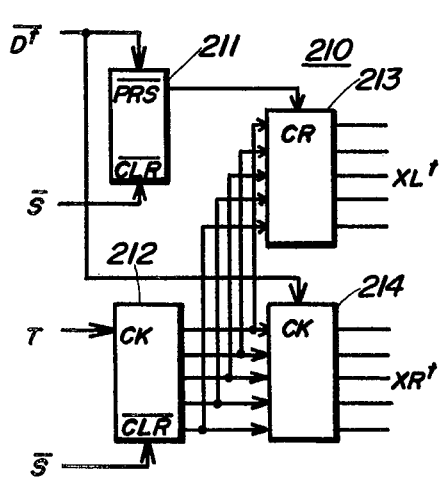
FIGS. 23 and 24 are circuit diagrams of a coordinates detector.
Figure 27:
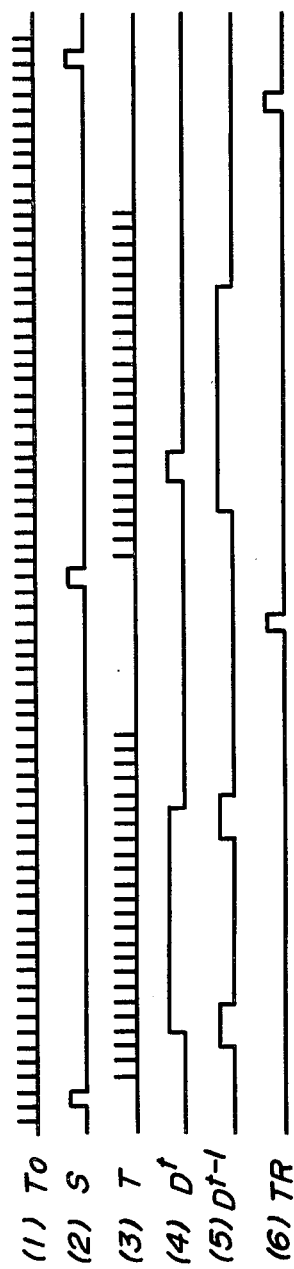
FIG. 27 is a waveform diagram of signals used in the circuits shown in FIGS. 20 through 25.

The output of the shift register $S_1$, namely, the output information $D^t$ on the t th line is sent to the first coordinate detector 210 and the output of $S_0$ or the information $D^{t-1}$ on the (t-1) th line to the second coordinates detector 220. The first coordinate detector 210, as viewed from FIG. 23, comprises a flip flop 211, a counter 212 and a pair of latches 213 and 214. A signal denoted T herein implies a bundle of twenty-four clock signals as illustrated in FIG. 27. A signal S is developed immediately before the clock signal T. The flip flop 211 and the counter 212 are reset with a reversed signal $\overline{S}$.

With such an arrangement, after the counter 212 and the flip flop 211 are placed into the reset state, the counter 212 counts the number of the clock signals generally denoted T. The count of the counter 212 shows the bit positions of the respective line shift registers $S_0$ through $S_{32}$, in other words the coordinates positions when viewing from the left edge as a reference. The character information $D^t$ on the t th line is applied to the flip flop 211 and the latch 214 and the flip flop 211 is placed into the set state by the signal which is indicative of the left edge portion of the character pattern. The set signal of the flip flop 211 is supplied to a latch input terminal of the latch 214. Under the circumstances, the count of the counter 212 or the coordinates $XL^t$ of the left edge position of the character pattern is fixedly stored in the latch 213. If the blank information comes subsequently to the end of the character pattern on the t th line, then the flip flop 211 will remain as it is and the instantaneous coordinates will be fixedly stored in the latch 214. However, in the case where the character portion disappears on the same line and then the blank information follows, the coordinates in the latch 214 will be up-dated. As a consequence, the latch 214 is fixed at the coordinates $XR^t$ of the most right edge portion of the character pattern.

Figure 24:
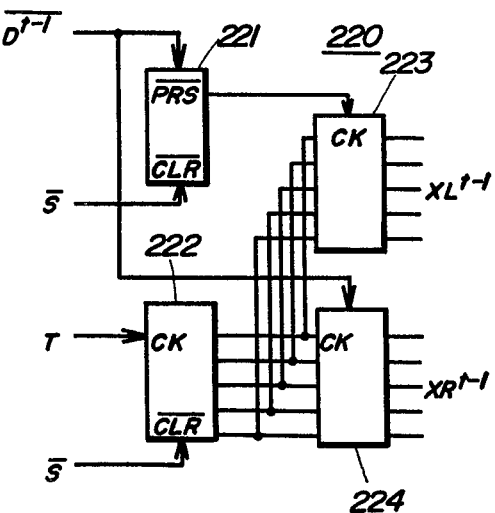

The output of the shift register $S_0$, on the other hand, is applied to the second coordinates detector 220 as shown in FIG. 24. The second coordinates detector 220 is similar to the first coordinates detector 210, which comprises a flip flop 221, a counter 222, a pair of latches 223 and 224. The coordinates position $XL^{t-1}$ of the left edge portion of the character information $D^{t-1}$ on the (t−1) th line and the coordinates position $XR^{t-1}$ of the right edge portion thereof are available from the latches 223 and 224, respectively.

Figure 25:
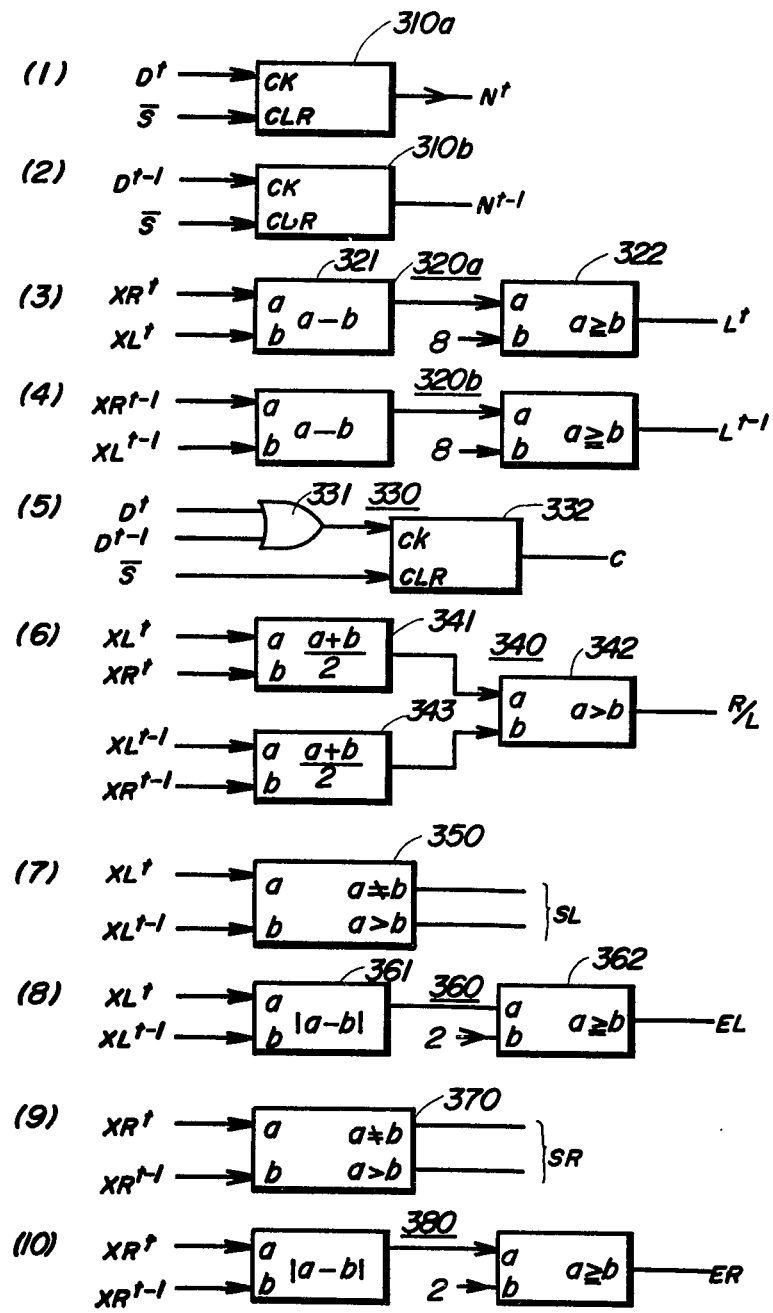
FIG. 25 is a detailed circuit diagram of a code converter employed in the preferred form of FIG. 21.

Those data $D^t$, $D^{t-1}$, $XL^t$, and $XL^{t-1}$ available from the storage 100, the first and second coordinates detectors 210 and 220 are distributed among the function units 310a, 310b, 320a, 320b, 330, 340, 350, 360, 370 and 380 as illustrated in FIGS. 21 and 25.

The function unit 310a is a counter responsive to the character information $D^t$ on the line t, which decides how many portions that character information consists of. The counter 310a is reset by the signal S (FIG. 27) and goes on counting during a period of time from the blank portion to the character marked portions on the t th line. It provides the number $N^t$ of the marked portions present on the n th line. The function unit 310b is similar to the above described function unit 310a, which provides the number $N^{t-1}$ of the marked portions present on the (n−1) th line.

The function unit 320a executes substraction upon the right edge position $XR^t$ and the left edge position $XL^t$ with the aid of a differential circuit 321, calculating the length of the character (marked) portion, on the t th line. A comparator 322 compares the resulting full length of the character portion with a given value (for example, 8 bits) and will provide the output "1" if the former is greater than the latter.

The function 320b provides the output "1" if the full length of the character portion on the (t−1) th line is greater, while viewing the left and right edge positions $XR^{t-1}$ and $XL^{t-1}$.

The function 330 is composed of a counter 332 which counts the number of the character marked portions in the case the information $D^t$ on the t th line and the information $D^{t-1}$ on the (t−1) th line are combined through an OR circuit 331. The counting result is denoted C.

The function 340 is an operation circuit 341 which receives as inputs the left and right edge positions $XL^t$ and $XR^t$ and executed operation of $$\frac{XR^t + XL^t}{2}$$

to calculate the central coordinates of the character portions on the t th line. While the result is supplied to a comparator 342, an operation circuit 343 executes operation $$\frac{XR^{t-1} + XL^{t-1}}{2},$$

that is, the central coordinates of the character portions on the (t−1) th line. This is led to the comparator 342.

The comparator 342 provides the output R/L—"1" when $$\frac{XR^t + XL^t}{2} > \frac{XR^{t-1} + XL^{t-1}}{2}$$

namely, when the central coordinates of the character portion on the t th line rest on the right of that on the (t−1) th line. Otherwise, the comparator 342 will provide the output R/L=O.

The function 350 provides a binary code value SL indicative of which one is on the right, the left edge portion of the character portion on the t th line or that on the (t−1) th line. SL can be represented as follows.

$$SL = \begin{cases} 00 \text{ (when } XL^t = XL^{t-1}) \\ 10 \text{ (when } XL^t < XL^{t-1}) \\ 11 \text{ (when } XL^t > XL^{t-1}) \end{cases}$$

The function 360 is responsive to the left edge positions $XL^t$ and $XL^{t-1}$ on the t th and (t−1)th lines wherein an operation circuit 361 evaluates the absolute value of a difference between these two inputs. The operation result is compared with a given value through the use of a comparator 362. The comparator 362 provides the output EL="1" when both the left edge portions stay more than a given value (for example, 2 bits) away from each other. Otherwide, it will provide the output EL="0".

The function 370 provides a binary code value SR indicative of which one is on the right, the right edge portion of the character portion on the t th line or that on the (t−1) th line. SR is defined as follows.

$$SR = \begin{cases} 00 \text{ (when } XR^t = XR^{t-1}) \\ 10 \text{ (when } XR^t = XR^{t-1}) \\ 11 \text{ (when } XR^t > XR^{t-1}) \end{cases}$$

Like the function 360, the function 380 provides ER="1" when both the right edge portions are spaced more than a given value away from each other. If such difference is below the given value, then ER="0".

Those results $N^t$, $N^{t-1}$, $L^t$, $L^{t-1}$, C, R/L, SL, EL, SR and ER from the functions 310 through 380 are supplied to the code converter 400. The code converter 400 is a PLA (Programmable Logic Array) with a 13-bit input and a 7-bit output. This is able to convert the inputs into the transition instructions $I^t$ of 4 bits pursuant to a conversion table shown in FIG. 26. The remaining three bits outputs provide control signals $F_0$, $F_1$ and $F_2$.

In FIG. 26, two-bit signal $N^t$ is represented by $N_1{}^t$ and $N_0{}^t$ and the upper half on the pattern column shows the character pattern on the t th line with the lower half showing that on the (t−1) line. On the column for the transition instructions $I^t$ there are depicted their associated output codes of 4 bits and symbols. On the input column a vacancy shows that a bit may be either "0" or "1". The following sets forth the correlation among the above described functions in detail in terms of the third and second lines of the numeral pattern "2" as shown in FIG. 22. In this instance the information $D^3$ on the third line (the information on the shift register $S_3$) is as follows.

| | |
|---|---|
| sum of the number of the character portions on the third line | $N^3 = 10$ |
| sum of the number of the character portions on the second line | $N^2 = 01$ |
| the number of the character portions when composed on the second and third lines | $C = 10$ |
| comparison between the central positions of the character portions on the t th and (t−1) th lines | $R/L = 1$ |

Therefore, the transition instructions $I^t$ are 1100 (the symbol is PL) according to the conversion table.

When the information $D^t$ shows a vacancy, $N^t=00$ with 9 signal $F_0$ developed. In the case where the information $D^t$ has three separate portions, $N^t=11$ with the development of a signal $F_1$. If the input signal does not come under the above conversion table, then a signal $F_2$ will be developed. With the help of the signal $F_2$ the CPU finds the character pattern in question unreadable. The character pattern is rejected and the recognition procedure comes to a halt. The signal $F_0$ is developed at the upper and lower blank portions where the character marked portions are not present. If the signal $F_0$ is developed at the lower blank portion, the table reference circuit 500 is not enabled until that signal $F_0$ will disappear. Provided that the non-character portion follows the end of the character portion and then the signal $F_0$ is developed, the table reference procedure will come to a stop and the internal conditions of the table reference circuit 500 will remain as it is. In addition, in the case where the character portion is interrupted into two and the signal $F_0$ is developed during such interruption period, the CPU 8 will discontinue the recognition procedure immediately and reject the character pattern in question.

The signal $F_1$ is developed in the neighborhood of the center of the characters like "9" and "6" (see FIG. 43). The signl $F_1$ is supposed to be developed where the character portion is a horizontal line by nature but somewhat modified as shown in FIG. 44. It is desirable that the character portion where the signal $F_1$ is developed be squashed in the vertical direction to reproduce a horizontal line. As a matter of fact, this can be accomplished by a circuit of FIG. 45. An addition shift register $S_0'$ is provided below the shift register $S_0$ which provides the output $D^{t-1}$. When the signal $F_1$ is LOW, an AND gate $g_1$ is closed and the output of an OR gate $g_2$ is $D^{t-1}$ as in case of the output of $S_0$. $S_0'$ receives these outputs. Contrarily, when the signal $F_1$ is HIGH, the AND gate $g_1$ is opened and the output of the OR gate $g_2$ is the OR'ed result $D^{t-1} \vee D^{t-2}$ which is supplied to the additional shift register $S_0'$.

Assume that the signal $F_1$ is developed because $D^t$ has three separate character portions. At this moment the circuit is ready for the next clock signal as shown in FIG. 46. At the beginning of the scanning procedure the output of the shift register $S_1$ is $D^{t-1}$ and the output of the OR gate $g_2$ is $D^t \vee D^{t-1} \vee D^{t-2}$ because of the AND gate $g_1$ opened. These outputs are supplied to $S_0'$ with the outcome as shown in FIG. 46(b).

Providing that $D^{t-1}$ has three separate portions $D(t_1+1), D(T_1+2) \ldots D(t_2-1)$ $(t_2 > t_1)$ with the development of the signal $F_1$ and $D^{t2}$ does not cause the development of the signal $F_1$, the OR logic operation will be executed in sequence beginned with $D^{t_1}$. When $D^{t2}$ is coming, the output of the OR gate $g_2$ is $D^{t-1} \vee D(t_1+1) \vee \ldots \vee D(t_2+1)$. The result is that these three portions are sequentially composed together with the one-line lower line. Meantime, the table reference circuit is not enabled so that these three portions of the pattern are squashed in the vertical direction for analysis purposes. In this paragraph $D^{t-1}$ is all substituted by the output of the OR gate $g_2$ (it is obvious from the conversion table that $F_1$ depends only upon $D^t$).

Simultaneously, the number of the signal $F_1$ is counted and, when the signal $F_1$ is developed more than seven times, the CPU 8 discontinues the recognition procedure immediately and judges the character pattern in question as rejected one.

The table reference circuit 500 comprises a plurality of subcircuits 510, 520, 530 and 540 as regards the first feature group and a plurality of subcircuits 550, 560 and 570 as regards the second feature group. These circuits 510, 520, 530 and 540 receive the transition instructions $I^t$ of 4 bits converted via the code converter 400. 550 consists of 3 bits of the combined outputs of the functions 350 and 360 or the combined signals SL and EL relating to the left edge portion of the character pattern, while the circuits 560 and 570 are 3 bits of the combined signals SR and ER relating to the right edge portion of the character pattern.

Figure 28:
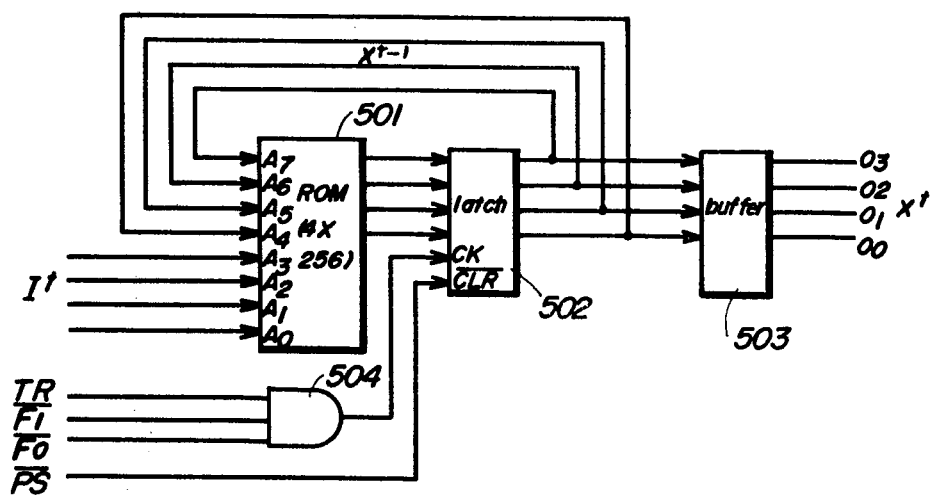
FIG. 28 is a circuit diagram of an example of a table reference circuit.
Figure 32:
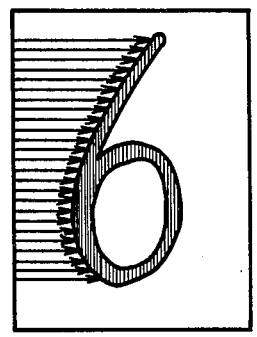
FIGS. 32 through 35 are explanatory diagrams showing a way of detecting bays of a character pattern in another preferred form of the present invention.
Figure 33:
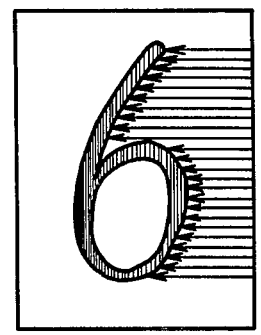
Figure 34:
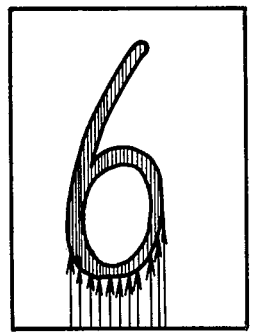
Figure 35:
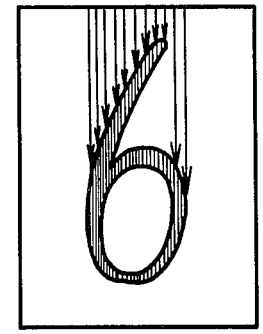

Each of the table reference circuit, as shown in FIG. 28, comprises a read only memory (ROM) 501 of 4×256 bits, a latch 502, a buffer 502 and an AND gate 504. The ROM 501 contains programs corresponding to the transition charts of FIGS. 15 through 19. The upper addresses $A_4$ through $A_7$ of the inputs to the ROM 501 are $X^{t-1}$ on the (t−1)th line, while the lower addresses $A_0$ through $A_3$ receive the information $I^t$ as regards the t th line, the output is transited into $X^t$.

Upon the application of the clock signal TR the latch 502 receives and latches the output $X^t$ of the ROM 501. The upper addresses of the ROM show $X^t$ and the internal condition thereof is shifted from $X^{t-1}$ to $X^t$.

Within the table reference circuit the latch 502 is first latched in response to the signal PS with $X^0=0000$. Upon the scanning of $D^1$ the transition instructions $I^1$ corresponding to $D^1$ are applied to the ROM 501. The upper 4 bits of the ROM 501 are supplied with the output of the latch 502 or $X^0$. The output of the ROM 501 is $X^1$ in response to the receipt of the transition instructions $I^1$.

Subsequently, when the transition instructions $I^2$ on the second line is supplied to the ROM 501, the output of the ROM 501 is $X^2$ which in turn is applied to the latch 502 upon the application of the clock signal TR. The output of the ROM 501 is transited each time the transition instructions $I^t$ are applied. Eventually, $X^{32}$ is achieved. The output $X^{32}$ is applied to the CPU 8 (FIG. 2) via the buffer 503.

In operation, when the signal $F_0$ or $F_1$ is developed on $D_{10}$ for example, the AND gate 504 is closed so that no clock signal TR is applied to the latch 502. Therefore, $X^9 = X^{10}$ and the transition instructions $I^{10}$ are overruled.

The CUP 8 stores the look-up table for example as shown in FIG. 29 for comparison with the respective features I through VII of the character pattern to be recognized. The codes representative of the final transition conditions $X^{32}$ of the respective table reference circuits 510, 520, ... 530 are compared with the look-up table for pattern recognition purposes. If the data from the respective table reference circuits are in agreement with FIG. 29 section "a" for example, then the CPU 8 will decide the character pattern in question is the numeral "2".

Although the respective features are illustrated in terms of shapes in FIG. 29, as a matter of fact the look-up table is stored in the form of their associated code notation within the CPU 8 as shown in FIGS. 30 and 31. When the output codes from the respective table reference circuits 510, 520, ... 570 are in agreement with the codes stored within the CPU 8, the corresponding character is recognized and outputted.

Another preferred form of the present invention will be described in the following manner. In this embodiment any character pattern is featured by the number of loops, the number of lateral lines, the number of bays and protrusions on the upper edge, lower edge, left edge and right edge portions and the number of swells on the left edge right edge portions. The bay used herein is a recessed portion in the character pattern with the depth of more than given bits. While the protrution used herein has the height of more than given bits at the both sides and the width of less than several bits, the swell extends given bits long.

The number of the loops, the number of the lateral lines, the number of protrusions, etc., are sensed in the same manner as the previous embodiment. As viewed from FIGS. 32 through 35, the number of the bays is counted in a manner that a distance from a reference line to the character portion is sensed from line-to-line and variations in these distances are detected. The same procedure is applicable to the protrusions and the swells.

In detecting the bays and so on the character pattern is first scanned in the horizontal direction to obtain position data in the horizontal direction and then scanned in the vertical direction to obtain that in the vertical direction.

Figure 36:
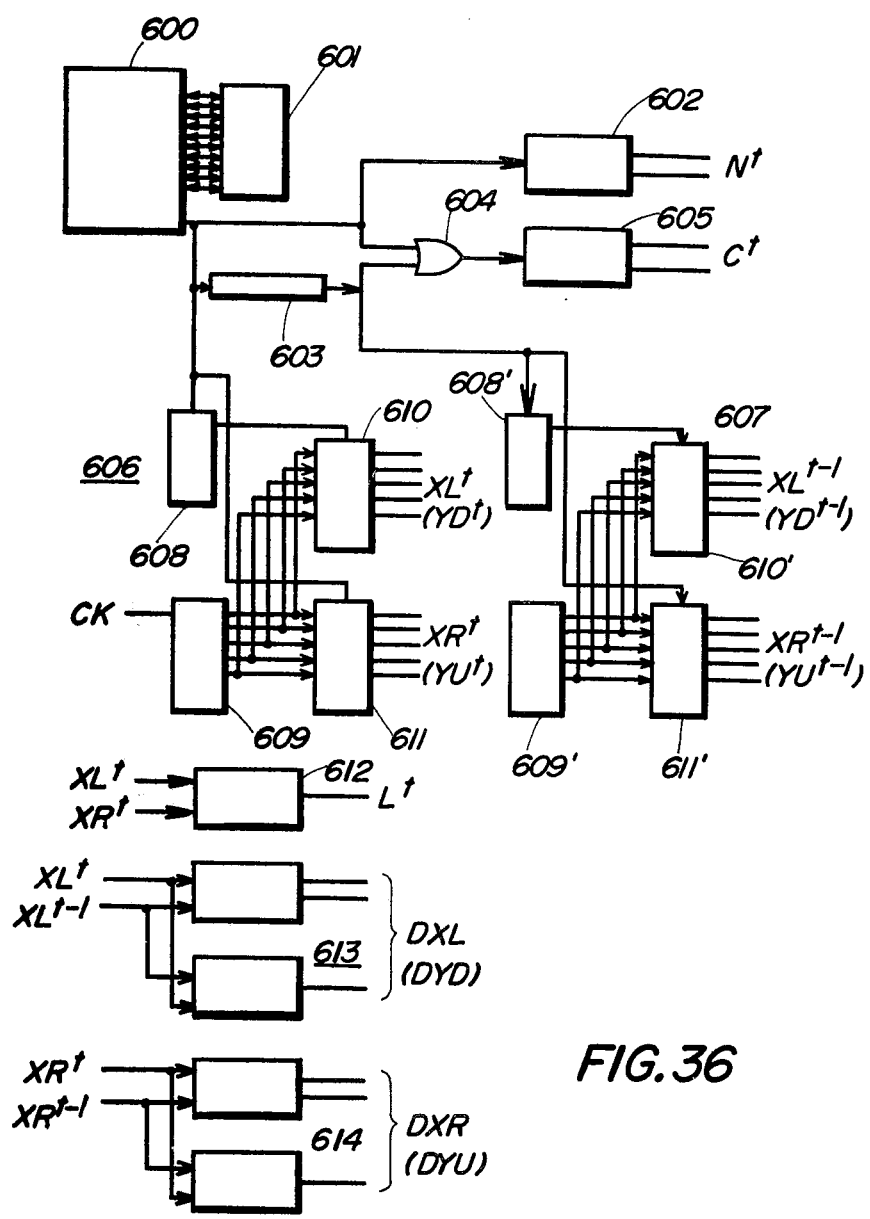
FIG. 36 is a block diagram of circuit construction of another preferred form.

FIG. 36 shows a circuit construction which analyzes one line or one column of the character pattern pursuant to the above summarized manner. This includes a storage 600 of 24 bits × 32 bits like the first embodiment.

An address control circuit 601 controls properly the address of the storage 600. During the first scanning the storage 600 is scanned line-by-line beginning with the lowest edge portion of the character pattern to send off character data in the horizontal direction. During the second scanning the character pattern is scanned column-by-column beginning with the left edge portion to send off character data in the vertical direction.

A counter 602 receives the character information from the storage 600 and is reset every one-line, which counts the number $N^t$ of the character marked portions on the t th line.

A buffer 603 stores one-line information or one-column information of the storage 600 and sends off information of the (t−1)th line or the (t−1)th column while the storage 600 is sending off information of the t th line or t th column. The output of the storage 600 and the output of the buffer 603 are applied via an OR circuit 604 to a counter 605, which computes the count $C^t$ of the character portions on the t th and (t−1)th lines.

A first coordinates store 606 latches the both edge portions of the character portions on the t th line or the t th column (the left and right coordinates $XL^t$ and $XR^t$ for the line information and the upper and lower coordinates $YU^t$ and $YD^t$ for the column information). A second coordinates store 607 latches the both edge coordinates $XL^{t-1}$, $XR^{t-1}$, $YU^{t-1}$ and $YD^{t-1}$ of the character portions on the (t−1) th line or the (t−1) th column. These coordinates stores 606 and 607 are similar in construction and operation to the above illustrated coordinates store 200 of FIG. 25, which includes a flip flop 608, a counter 609 and a pair of latches 610 and 611.

The coordinates stores 606 and 607 provide the coordinates information of the character portion on the line direction while the storage 600 is subject to the first scanning and provide the coordinates information on the column direction during the second scanning.

612 decides in response to the outputs $XL^t$ and $XR^t$ of the latches 610 and 611 whether the length of the character portion is 7 bits or more. The result is represented by a binary value signal.

$$L^t = \begin{cases} 1 \text{ (when } L^t \geq 7) \\ 2 \text{ (when } L^t < 7) \end{cases}$$

Figures 37, 38:
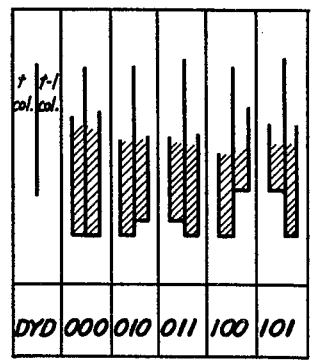
FIGS. 37 and through 40 show some examples of features of a character pattern and output codes.
Figure 41:
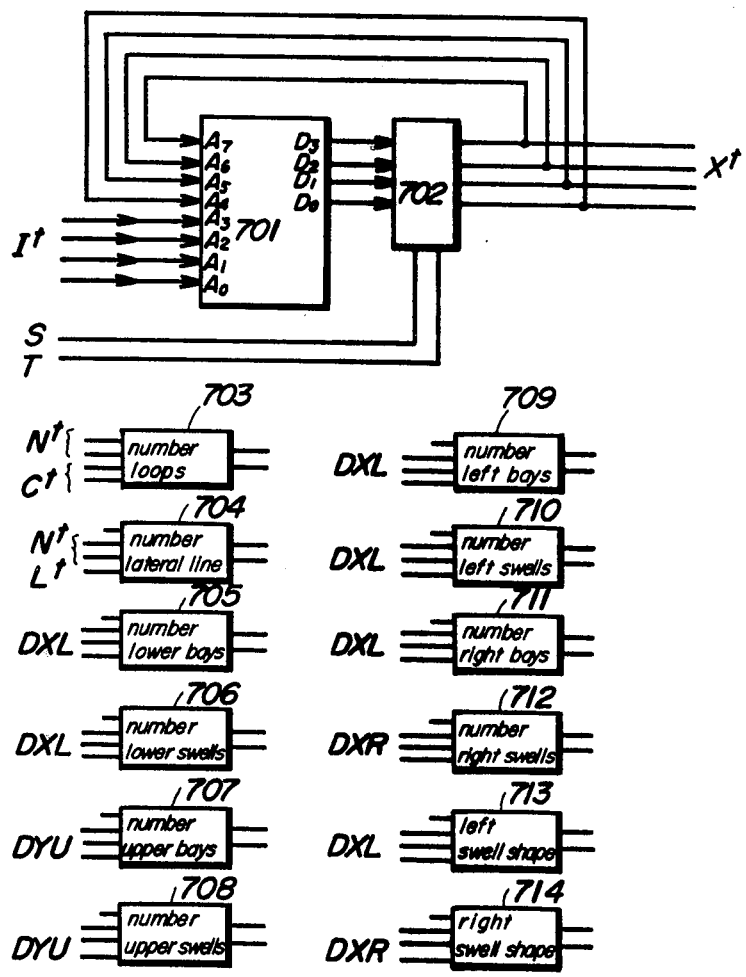
FIG. 41 is an example of a table reference circuit and a feature detector employed in another preferred form.

An operation circuit 613 computes a difference DXL between the left edge portion of the character portion on the t th line and the counterpart on the (t−1)th line, and provides bit codes $DX^t$ as shown in FIG. 41 according to the correlation between the left edge positions on the t th line and the (t−1)th line. An operation circuit 614 computes a difference between the left edge position and the right edge position of the character portion on the (t−1)th line. This is similar to the operation circuit 613. Details of DXR are illustrated in FIG. 38.

Figures 39, 40:
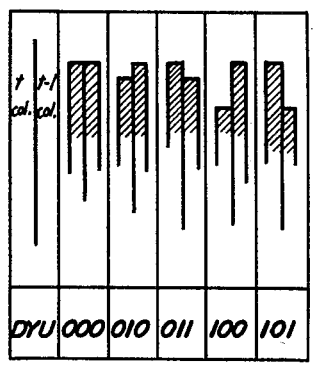

The operation circuits 613 and 614 are responsive to the outputs of the coordinates detectors 606 and 607 and provides codes DYD and DYU representative of the upper and lower coordinates as shown in FIGS. 39 and 40.

These operation results are applied to table reference circuits 703 through 714 each consisting of a ROM 701 and a latch 702 as shown in FIG. 41, reproducing the respective features such as the number of loops, the number of the lateral lines, the number of the upper and lower bays, etc. These features are encoded and sent to the CPU 8. The CPU 8 contains a look-up table as shown in FIG. 42 and compare these feature codes with the look-up table for character recognition purposes.

Although in the above illustrated embodiments the first scanning and the second scanning is contiguous to each other therebetween. It is obvious that the symbols V, I, D, etc., of the pattern information is not necessarily limited to those of FIGS. 14(A) through 14(C).

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical character reader comprising:

memory means for storing a character pattern in addressable parallel segments, all of said segments extending in a common linear direction;

means for retrieving character pattern information from said addressable parallel segments;

classification means responsive to said means for retrieving for comparing character pattern information in retrieved adjacent segments two at a time and classifying the combined character pattern information of each two retrieved adjacent segments into a predetermined number of groups of predefined shapes without regard to specific address information within each of said segments; and identification means for comparing the combinations of groups of predefined shapes of the respective adjacent segments with reference information to identify the character patterns, said reference information including predetermined combinations of said groups of predefined shapes for each character to be identified.

2. The optical character reader of claim 1, wherein said classification means comprises:

means for correlating said predefined shapes of the character pattern information in the respective adjacent segments to at least the following features of the overall character pattern;

(a) the number of loops in said character pattern, (b) the shape of the lower edge portion of said character pattern, (c) the shape of the upper edge portion of said character pattern, (d) the number of connections of lateral lines within said character pattern, (e) the number of hollows on the left edge portion of said character pattern, (f) the number of hollows on the right edge portion of said character pattern, and (g) the number of swells on the right edge portion of said character pattern, whereby said reference information is correlated to the same said features to facilitate identification of said character patterns.

* * * * *